(12) United States Patent
Kim et al.

(10) Patent No.: US 10,325,185 B1
(45) Date of Patent: Jun. 18, 2019

(54) METHOD AND DEVICE FOR ONLINE BATCH NORMALIZATION, ON-DEVICE LEARNING, AND CONTINUAL LEARNING APPLICABLE TO MOBILE DEVICES OR IOT DEVICES ADDITIONALLY REFERRING TO ONE OR MORE PREVIOUS BATCHES TO BE USED FOR MILITARY PURPOSE, DRONE OR ROBOT, AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/255,446

(22) Filed: Jan. 23, 2019

(51) Int. Cl.
*G06K 9/00* (2006.01)
*G06K 9/66* (2006.01)
*G06K 9/62* (2006.01)

(52) U.S. Cl.
CPC ............. *G06K 9/66* (2013.01); *G06K 9/6221* (2013.01); *G06K 9/6265* (2013.01)

(58) Field of Classification Search
CPC ............................ G06T 3/4046; G06T 3/4084
See application file for complete search history.

(56) References Cited

U.S. PATENT DOCUMENTS

| 5,479,576 A | * | 12/1995 | Watanabe | ................ | G06N 3/08 706/25 |
| 10,127,495 B1 | * | 11/2018 | Bopardikar | .............. | G06N 3/08 |

(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*

(Continued)

*Primary Examiner* — John B Strege
(74) *Attorney, Agent, or Firm* — Xsensus LLP (57) ABSTRACT

A method of online batch normalization, on-device learning, or continual learning which are applicable to mobile devices, IoT devices, and the like is provided. The method includes steps of: (a) computing device instructing convolutional layer to acquire k-th batch, and to generate feature maps for k-th batch by applying convolution operations to input images included in k-th batch respectively; and (b) computing device instructing batch normalization layer to calculate adjusted averages and adjusted variations of the feature maps by referring to the feature maps in case k is 1, and the feature maps and previous feature maps, included in at least part of previous batches among previously generated first to (k−1)-th batches in case k is integer from 2 to m, and to apply batch normalization operations to the feature maps. Further, the method may be performed for military purpose, or other devices such as drones, robots.

26 Claims, 4 Drawing Sheets

(56) References Cited

U.S. PATENT DOCUMENTS

| | | | | |
|---|---|---|---|---|
| 10,198,671 | B1* | 2/2019 | Yang | G06K 9/6269 |
| 2016/0148079 | A1* | 5/2016 | Shen | G06K 9/4628 |
| | | | | 382/157 |
| 2016/0217368 | A1* | 7/2016 | Ioffe | G06N 3/04 |
| 2017/0011281 | A1* | 1/2017 | Dijkman | G06K 9/66 |
| 2017/0046616 | A1* | 2/2017 | Socher | G06N 3/088 |
| 2017/0124409 | A1* | 5/2017 | Choi | G06N 3/0454 |
| 2017/0124415 | A1* | 5/2017 | Choi | G06N 3/08 |
| 2017/0132496 | A1* | 5/2017 | Shoaib | G06K 9/66 |
| 2017/0169315 | A1* | 6/2017 | Vaca Castano | G06K 9/3233 |
| 2017/0206431 | A1* | 7/2017 | Sun | G06N 3/084 |
| 2018/0032857 | A1* | 2/2018 | Lele | G06N 3/04 |
| 2018/0096457 | A1* | 4/2018 | Savvides | G06K 9/6267 |
| 2018/0107925 | A1* | 4/2018 | Choi | G06F 17/16 |
| 2018/0107926 | A1* | 4/2018 | Choi | G06F 7/582 |
| 2018/0197081 | A1* | 7/2018 | Ji | G06N 3/0454 |
| 2018/0211403 | A1* | 7/2018 | Hotson | G06K 9/4604 |
| 2018/0247180 | A1* | 8/2018 | Cheng | G06K 9/46 |
| 2018/0268234 | A1* | 9/2018 | Yang | G06N 3/063 |
| 2019/0012548 | A1* | 1/2019 | Levi | G06K 9/00791 |
| 2019/0020871 | A1* | 1/2019 | Xu | H04N 19/124 |
| 2019/0050681 | A1* | 2/2019 | Tate | G06K 9/6232 |
| 2019/0073553 | A1* | 3/2019 | Yao | G06K 9/46 |
| 2019/0095777 | A1* | 3/2019 | Kim | G06N 3/04 |

OTHER PUBLICATIONS

Sun et al., Face detection using deep learning: an improved faster RCNN approach, Elsevier B.V., Mar. 2018.*
Ren et al., Faster R-CNN: Towards Real-Time Object Detection with Region Proposal Networks, 2015.*
Du et al., Fused DNN: A deep neural network fusion approach to fast and robust pedestrian detection, IEEE, 2017.*
Girshick et al., Fast R-CNN, 2015.*

* cited by examiner

METHOD AND DEVICE FOR ONLINE BATCH NORMALIZATION, ON-DEVICE LEARNING, AND CONTINUAL LEARNING APPLICABLE TO MOBILE DEVICES OR IOT DEVICES ADDITIONALLY REFERRING TO ONE OR MORE PREVIOUS BATCHES TO BE USED FOR MILITARY PURPOSE, DRONE OR ROBOT, AND TESTING METHOD AND TESTING DEVICE USING THE SAME

FIELD OF THE DISCLOSURE

The present disclosure relates to a method and a device for online batch normalization, on-device learning or continual learning which are applicable to mobile devices, IoT devices, and the like additionally referring to one or more previous batches to be used for military purpose, or other devices such as drones, robots; and more particularly, to the method of batch normalization by using feature values of each batch including its corresponding input images, wherein the batches include a first to an m-th batches, including steps of: (a) instructing a convolutional layer of a CNN (i) to acquire a k-th batch, wherein k is an integer from 1 to m, and (ii) to generate feature maps for the k-th batch by applying convolution operations to the input images included in the k-th batch respectively; and (b) the computing device instructing a batch normalization layer of the CNN to (I) calculate one or more adjusted averages and one or more adjusted variations of the feature maps for the k-th batch by referring to (i) the feature maps for the k-th batch in case k is 1, and (ii) the feature maps for the k-th batch and previous feature maps, included in at least part of previous batches selected among the first to a (k−1)-th batches, which were previously generated in case k is an integer from 2 to m, and to (II) generate adjusted feature maps by applying batch normalization operations to the feature maps for the k-th batch by referring to the adjusted averages and the adjusted variations, and a computing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Meanwhile, a batch normalization is a method of normalizing feature maps using each of averages and each of variances per each channel of each mini batch including training images. The batch normalization is used for preventing internal covariate shift, which is an undesirable phenomenon that distributions of inputs change layer by layer in the Neural Network. Advantages of the batch normalization include (i) accelerating the speed of training, (ii) evenly training entire weights in the neural network, and (iii) augmenting features.

A conventional batch normalization will be explained by referring to FIG. 4.

Figure 4:
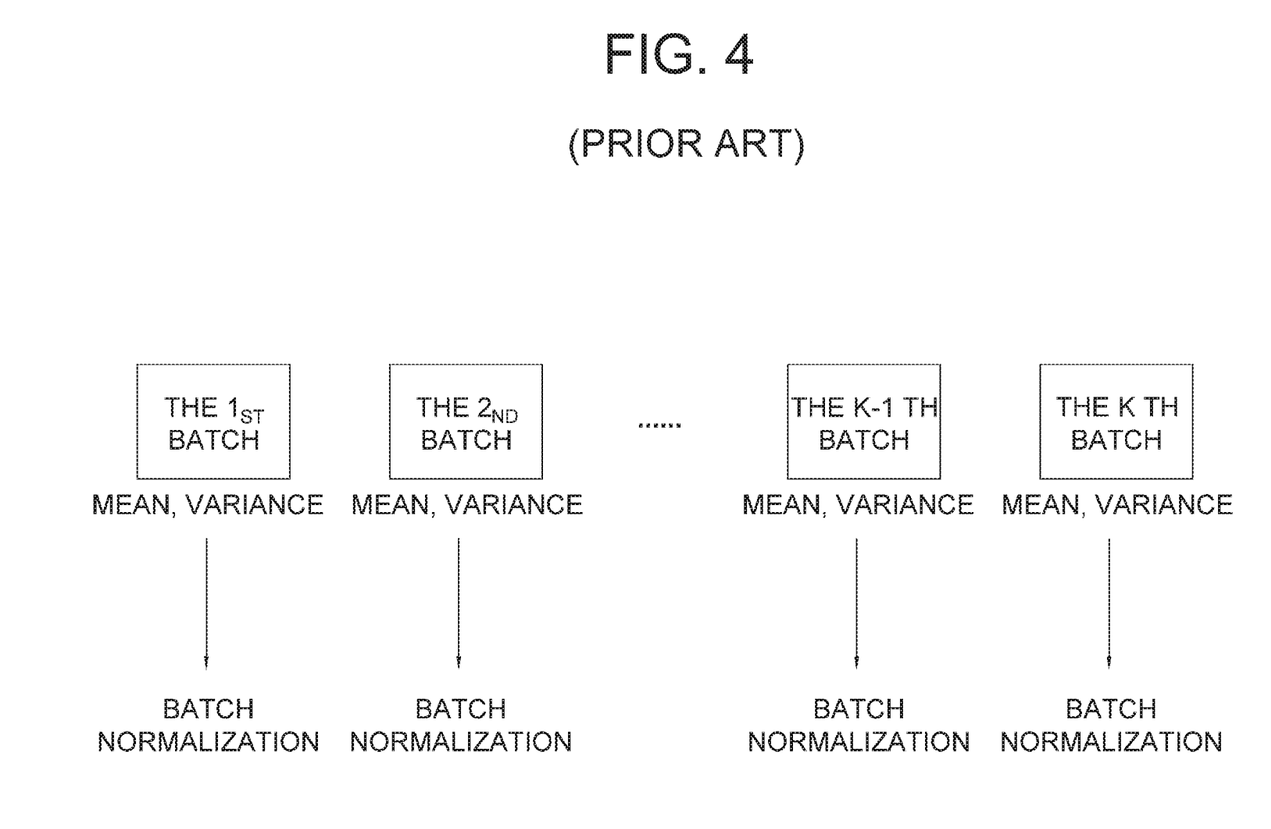
FIG. 4 shows an example process of conventional batch normalization.

By referring to FIG. 4, it may be seen that, if there are m batches including input images, the conventional batch normalization is performed by (i) instructing a convolutional layer of each convolutional block to generate feature maps for a k-th batch by applying convolution operations to the input images included in the k-th batch, (ii) instructing a batch normalization layer of each convolutional block to generate one or more averages and one or more variations of the feature maps for the k-th batch, and (iii) instructing a batch normalization layer of each convolutional block to normalize the feature maps for the k-th batch so that the averages and the variations would become a specific first value and a specific second value respectively. That is, the batch normalization for a specific batch is performed by using only averages and variations of feature maps for the specific batch. Herein, k is an integer from 1 to m.

If a size of each batch is set to be too small, it cannot be assumed that values of the feature maps for each of the batches follow a normal distribution. Because of this, a performance of the conventional batch normalization falls. This is a critical shortcoming of the conventional batch normalization.

SUMMARY OF THE DISCLOSURE

It is an object of the present disclosure to solve all problems explained above.

It is another object of the present disclosure to provide a method for achieving an effective batch normalization for a k-th batch by further referring to previous feature maps included in at least part of a first to a (k−1)-th batches even if the k-th batch is small-sized.

It is still another object of the present disclosure to provide a method for selecting specific previous batches, to be used for the batch normalization, among previous batches by referring to information on each of the batches.

In accordance with one aspect of the present disclosure, there is provided a method of batch normalization by using feature values of each batch including its corresponding input images, wherein the batches include a first to an m-th batches, including steps of: (a) a computing device instructing a convolutional layer of a CNN (i) to acquire a k-th batch, wherein k is an integer from 1 to m, and (ii) to generate feature maps for the k-th batch by applying convolution operations to the input images included in the k-th batch respectively; and (b) the computing device instructing a batch normalization layer of the CNN to (I) calculate one or more adjusted averages and one or more adjusted variations of the feature maps for the k-th batch by referring to (i) the feature maps for the k-th batch in case k is 1, and (ii) the feature maps for the k-th batch and previous feature maps, included in at least part of previous batches selected among the first to a (k−1)-th batches, which were previously generated in case k is an integer from 2 to m, and to (II) generate adjusted feature maps by applying batch normalization operations to the feature maps for the k-th batch by referring to the adjusted averages and the adjusted variations.

As one example, the method further includes a step of: (c) the computing device instructing an activation layer of the CNN to generate re-adjusted feature maps by applying nonlinear operations to the adjusted feature maps.

As one example, the CNN includes a first to an n-th convolutional blocks each of which includes the convolutional layer, the batch normalization layer and the activation layer, wherein, if the k-th batch is acquired, the re-adjusted feature maps are generated by applying operations through the first to the n-th convolutional blocks to the input images included in the k-th batch, wherein, if x is an integer from 2 to n, the re-adjusted feature maps are generated by allowing (x−1)-th re-adjusted feature maps outputted from an (x−1)-th convolutional block to be inputted to an x-th convolutional block, and instructing an x-th convolutional block to generate x-th re-adjusted feature maps.

As one example, the method further includes steps of: (d) the computing device instructing an output layer of the CNN to generate CNN output values by applying output operations to n-th re-adjusted feature maps outputted from the n-th convolutional block; and (e) the computing device instructing a loss layer to generate losses by referring to the CNN output values and their corresponding GTs, and learning parameters of the CNN by backpropagating the loss.

As one example, the batch normalization operations are operations that normalize values included in the feature maps for the k-th batch such that the adjusted averages and the adjusted variations are adjusted to a first value and a second value respectively.

As one example, by referring to variations of the feature maps for the k-th batch, the batch normalization layer determines the number of the batches, selected among the first to the (k−1)-th batches, to be used for generating the adjusted averages and the adjusted variations.

As one example, if variations of the feature maps for the k-th batch are smaller than a specific threshold value, the batch normalization layer calculates the adjusted averages and the adjusted variations by referring to (i) the feature maps for the k-th batch only or (ii) the feature maps for the k-th batch and specific previous feature maps for one or more specific previous batches, wherein the specific previous batches are selected among the first to the (k−1)-th batches such that a ratio of the number of the specific previous batches to (k−1) is less than a predefined number.

As one example, by referring to the number of the input images included in the k-th batch, the batch normalization layer determines a ratio of the number of specific previous batches to (k−1), wherein the specific previous batches, to be used for calculating the adjusted averages and the adjusted variations, are selected among the first to the (k−1)-th batches.

As one example, the batch normalization layer calculates the adjusted averages and the adjusted variations by referring to (i) the feature maps for the k-th batch with a first weight assigned thereto, and (ii) the previous feature maps for at least part of the first to the (k−1)-th previous batches with one or more second weights assigned thereto.

As one example, the batch normalization layer selects specific previous batches, to be used for calculating the adjusted averages and the adjusted variations of the feature maps for the k-th batch, among the first to the (k−1)-th batches by referring to the number of times that each of the previous feature maps corresponding to each of the first to the (k−1)-th batches was used during the process of generating each of adjusted averages and each of adjusted variations for the second to the (k−1)-th batches.

As one example, the batch normalization layer selects specific previous batches, to be used for calculating the adjusted averages and the adjusted variations of the feature maps for the k-th batch, among the first to the (k−1)-th batches by referring to (i) information on whether each of averages of the previous feature maps corresponding to each of the first to the (k−1)-th batches is in a first specific range which is determined by referring to a first value or not, or (ii) information on whether each of variations of the previous feature maps corresponding to each of the first to the (k−1)-th batches is in a second specific range determined by referring to a second value or not.

As one example, the batch normalization layer generates the adjusted feature maps for the k-th batch by applying linear operation to the feature maps for the k-th batch after the batch normalization operation is applied thereto, wherein the linear operation follows a formula below, adjusted_feature_map=γ*AF+β γ is a scaling parameter, β is a bias parameter, and AF are feature maps for the k-th batch that batch normalization operation is applied thereto.

In accordance with another aspect of the disclosure, there is provided a testing method of batch normalization by using feature values of each batch including its corresponding test images, wherein the batches include a first to an m-th batches, including steps of: (a) on condition that (1) a learning device has instructed a convolutional layer of a CNN (i) to acquire a k-th batch for training, wherein k is an integer from 1 to m, and (ii) to generate feature maps for training for the k-th batch for training by applying convolution operations to training images included in the k-th batch for training respectively; (2) the learning device has instructed a batch normalization layer of the CNN to (I) calculate one or more adjusted averages for training and one or more adjusted variations for training of the feature maps for training for the k-th batch for training by referring to (i) the feature maps for training for the k-th batch for training in case k is 1, and (ii) the feature maps for training for the k-th batch for training and previous feature maps for training, included in at least part of previous batches for training selected among the first to a (k−1)-th batches for training, which were previously generated in case k is an integer from 2 to m, and to (II) generate adjusted feature maps for training by applying batch normalization operations to the feature maps for training for the k-th batch for training by referring to the adjusted averages for training and the adjusted variations for training; (3) the learning device has instructed an activation layer of the CNN to generate re-adjusted feature maps for training by applying nonlinear operations to the adjusted feature maps for training, wherein the CNN includes a first to an n-th convolutional blocks each of which includes the convolutional layer, the batch normalization layer and the activation layer, wherein, if the k-th batch for training is acquired, the re-adjusted feature maps for training are generated by applying operations through the first to the n-th convolutional blocks to the training images included in the k-th batch for training, wherein, if x is an integer from 2 to n, x-th re-adjusted feature maps for training are generated by allowing (x−1)-th re-adjusted feature maps for training outputted from an (x−1)-th convolutional block to be inputted to an x-th convolutional block, and has instructed an x-th convolutional block to generate the x-th re-adjusted feature maps for training; (4) the learning device has instructed an output layer of the CNN to generate CNN output values for training by applying output operations to n-th re-adjusted feature maps for training outputted from the n-th convolutional block; and (5) the learning device has instructed a loss layer of the CNN to generate losses by referring to the CNN output values for training and their corresponding GTs, and has learnt parameters of the CNN by backpropagating the loss, a testing device instructing a convolutional layer of a CNN (i) to acquire a k-th batch for testing, wherein k is an integer from 1 to m, and (ii) to generate feature maps for testing for the k-th batch for testing by applying convolution operations to test images included in the k-th batch for testing respectively; (b) the testing device instructing a batch normalization layer of the CNN to (I) calculate one or more adjusted averages for testing and one or more adjusted variations for testing of the feature maps for testing for the k-th batch for testing by referring to (i) the feature maps for testing for the k-th batch for testing in case k is 1, and (ii) the feature maps for testing for the k-th batch for testing and previous feature maps for testing, included in at least part of previous batches for testing selected among the first to a (k−1)-th batches for testing, which were previously generated in case k is an integer from 2 to m, and to (II) generate adjusted feature maps for testing by applying batch normalization operations to the feature maps for testing for the k-th batch for testing by referring to the adjusted averages for testing and the adjusted variations for testing; (c) the testing device instructing an activation layer of the CNN to generate re-adjusted feature maps for testing by applying nonlinear operations to the adjusted feature maps for testing, wherein the CNN includes a first to an n-th convolutional blocks each of which includes the convolutional layer, the batch normalization layer and the activation layer, wherein, if the k-th batch for testing is acquired, the re-adjusted feature maps for testing are generated by applying operations through the first to the n-th convolutional blocks to the input test images included in the k-th batch for testing, wherein, if x is an integer from 2 to n, the re-adjusted feature maps for testing are generated by allowing (x−1)-th re-adjusted feature maps for testing outputted from an (x−1)-th convolutional block to be inputted to an x-th convolutional block, and instructing an x-th convolutional block to generate x-th re-adjusted feature maps for testing; and (d) the testing device instructing an output layer of the CNN to generate CNN output values for testing by applying output operations to n-th re-adjusted feature maps for testing outputted from the n-th convolutional block.

In accordance with still another aspect of the present disclosure, there is provided a computing device of batch normalization by using feature values of each batch including its corresponding input images, wherein the batches include a first to an m-th batches, including: at least one memory that stores instructions; and at least one processor configured to execute the instructions to: perform processes of (1) instructing a convolutional layer of a CNN to generate feature maps for a k-th batch by applying convolution operations to the input images included in the k-th batch respectively, wherein k is an integer from 1 to m; and (2) instructing a batch normalization layer of the CNN to (I) calculate one or more adjusted averages and one or more adjusted variations of the feature maps for the k-th batch by referring to (i) the feature maps for the k-th batch in case k is 1, and (ii) the feature maps for the k-th batch and previous feature maps, included in at least part of previous batches selected among the first to a (k−1)-th batches, which were previously generated in case k is an integer from 2 to m, and to (II) generate adjusted feature maps by applying batch normalization operations to the feature maps for the k-th batch by referring to the adjusted averages and the adjusted variations.

As one example, the processor further performs a process of: (3) instructing an activation layer of the CNN to generate re-adjusted feature maps by applying nonlinear operations to the adjusted feature maps.

As one example, the CNN includes a first to an n-th convolutional blocks each of which includes the convolutional layer, the batch normalization layer and the activation layer, wherein, if the k-th batch is acquired, the re-adjusted feature maps are generated by applying operations through the first to the n-th convolutional blocks to the input images included in the k-th batch, wherein, if x is an integer from 2 to n, the re-adjusted feature maps are generated by allowing (x−1)-th re-adjusted feature maps outputted from an (x−1)-th convolutional block to be inputted to an x-th convolutional block, and instructing an x-th convolutional block to generate x-th re-adjusted feature maps.

As one example, the processor further performs processes of: (4) instructing an output layer of the CNN to generate CNN output values by applying output operations to n-th re-adjusted feature maps outputted from the n-th convolutional block; and (5) instructing a loss layer to generate losses by referring to the CNN output values and their corresponding GTs, and learning parameters of the CNN by backpropagating the loss.

As one example, the batch normalization operations are operations that normalize values included in the feature maps for the k-th batch such that the adjusted averages and the adjusted variations are adjusted to a first value and a second value respectively.

As one example, by referring to variations of the feature maps for the k-th batch, the batch normalization layer determines the number of the batches, selected among the first to the (k−1)-th batches, to be used for calculating the adjusted averages and the adjusted variations.

As one example, if variations of the feature maps for the k-th batch are smaller than a specific threshold value, the batch normalization layer calculates the adjusted averages and the adjusted variations by referring to (i) the feature maps for the k-th batch only or (ii) the feature maps for the k-th batch and specific previous feature maps for one or more specific previous batches, wherein the specific previous batches are selected among the first to the (k−1)-th batches such that a ratio of the number of the specific previous batches to (k−1) is less than a predefined number.

As one example, by referring to the number of the input images included in the k-th batch, the batch normalization layer determines a ratio of the number of specific previous batches to (k−1), wherein the specific previous batches, to be used for calculating the adjusted averages and the adjusted variations, are selected among the first to the (k−1)-th batches.

As one example, the batch normalization layer calculates the adjusted averages and the adjusted variations by referring to (i) the feature maps for the k-th batch with a first weight assigned thereto, and (ii) the previous feature maps for at least part of the first to the (k−1)-th previous batches with one or more second weights assigned thereto.

As one example, the batch normalization layer selects specific previous batches, to be used for calculating the adjusted averages and the adjusted variations of the feature maps for the k-th batch, among the first to the (k−1)-th batches by referring to the number of times that each of the previous feature maps corresponding to each of the first to the (k−1)-th batches was used during the process of calculating each of adjusted averages and each of adjusted variations for the second to the (k−1)-th batches.

As one example, the batch normalization layer selects specific previous batches, to be used for calculating the adjusted averages and the adjusted variations of the feature maps for the k-th batch, among the first to the (k−1)-th batches by referring to (i) information on whether each of averages of the previous feature maps corresponding to each of the first to the (k−1)-th batches is in a first specific range which is determined by referring to a first value or not, or (ii) information on whether each of variations of the previous feature maps corresponding to each of the first to (k−1)-th batches is in a second specific range determined by referring to a second value or not.

As one example, the batch normalization layer generates the adjusted feature maps for the k-th batch by applying linear operation to the feature maps for the k-th batch after the batch normalization operation is applied thereto, wherein the linear operation follows a formula below, adjusted_feature_map=γ*AF+β γ is a scaling parameter, β is a bias parameter, and AF are feature maps for the k-th batch that batch normalization operation is applied thereto.

In accordance with still yet another aspect of the disclosure, a testing device of batch normalization by using feature values of each batch including its corresponding test images, wherein the batches include a first to an m-th batches, including: at least one memory that stores instructions; and at least one processor, on condition that (1) a learning device has instructed a convolutional layer of a CNN (i) to acquire a k-th batch for training, wherein k is an integer from 1 to m, and (ii) to acquire feature maps for training for the k-th batch for training by applying convolution operations to training images included in the k-th batch for training respectively, (2) the learning device has instructed a batch normalization layer of the CNN to (I) calculate adjusted averages for training and adjusted variations for training of the feature maps for training for the k-th batch for training by referring to (i) the feature maps for training for the k-th batch for training in case k is 1, and (ii) the feature maps for training for the k-th batch for training and previous feature maps for training, included in at least part of previous batches for training selected among the first to a (k−1)-th batches for training, which were previously generated in case k is an integer from 2 to m, and to (II) generate adjusted feature maps for training by applying batch normalization operations to the feature maps for training for the k-th batch for training by referring to the adjusted averages for training and the adjusted variations for training, (3) the learning device has instructed an activation layer of the CNN to generate re-adjusted feature maps for training by applying nonlinear operations to the adjusted feature maps for training, wherein the CNN includes a first to an n-th convolutional blocks each of which includes the convolutional layer, the batch normalization layer and the activation layer, wherein, if the k-th batch for training is acquired, the re-adjusted feature maps for training are generated by applying convolution operations through the first to the n-th convolutional blocks to the training images included in the k-th batch for training, wherein, if x is an integer from 2 to n, x-th re-adjusted feature maps for training are generated by allowing (x−1)-th re-adjusted feature maps for training outputted from an (x−1)-th convolutional block to be inputted to an x-th convolutional block, and has instructed an x-th convolutional block to generate the x-th re-adjusted feature maps for training, (4) the learning device has instructed an output layer of the CNN to generate CNN output values for training by applying output operations to n-th re-adjusted feature maps for training outputted from the n-th convolutional block, and (5) the learning device has instructed a loss layer of the CNN to generate losses by referring to the CNN output values for training and their corresponding GTs, and has learnt parameters of the CNN by backpropagating the loss; configured to execute the instructions to: perform processes of (1) instructing a convolutional layer of a CNN to acquire feature maps for testing for a k-th batch for testing by applying convolution operations to test images included in the k-th batch for testing respectively, wherein k is an integer from 1 to m; (2) instructing a batch normalization layer of the CNN to (I) calculate adjusted averages for testing and adjusted variations for testing of the feature maps for testing for the k-th batch for testing by referring to (i) the feature maps for testing for the k-th batch for testing in case k is 1, and (ii) the feature maps for testing for the k-th batch for testing and previous feature maps for testing, included in at least part of previous batches for testing selected among the first to a (k−1)-th batches for testing, which were previously generated in case k is an integer from 2 to m, and to (II) generate adjusted feature maps for testing by applying batch normalization operations to the feature maps for testing for the k-th batch for testing by referring to the adjusted averages for testing and the adjusted variations for testing; (3) instructing an activation layer of the CNN to generate re-adjusted feature maps for testing by applying nonlinear operations to the adjusted feature maps for testing, wherein the CNN includes a first to an n-th convolutional blocks each of which includes the convolutional layer, the batch normalization layer and the activation layer, wherein, if the k-th batch for testing is acquired, the re-adjusted feature maps for testing are generated by applying convolution operations through the first to the n-th convolutional blocks to the input test images included in the k-th batch for testing, wherein, if x is an integer from 2 to n, the re-adjusted feature maps for testing are generated by allowing (x−1)-th re-adjusted feature maps for testing outputted from an (x−1)-th convolutional block to be inputted to an x-th convolutional block, and instructing an x-th convolutional block to generate x-th re-adjusted feature maps for testing; (4) instructing an output layer of the CNN to generate CNN output values for testing by applying output operations to n-th re-adjusted feature maps for testing outputted from the n-th convolutional block.

BRIEF DESCRIPTION OF THE DRAWINGS

The drawings attached below to explain example embodiments of the present disclosure are only part of example embodiments of the present disclosure and other drawings may be obtained based on the drawings without inventive work for those skilled in the art.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

Figure 1:
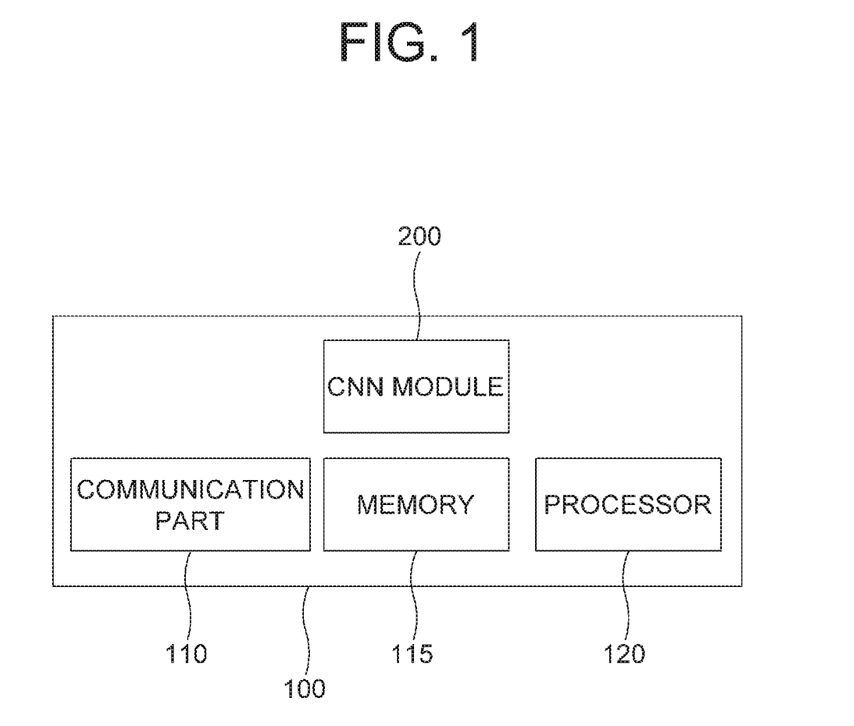
FIG. 1 shows a configuration of a computing device performing a batch normalization by additionally referring to previous batches in accordance with the present disclosure.

FIG. 1 shows a configuration of a computing device in accordance with the present disclosure.

By referring to FIG. 1, a computing device 100 may include a CNN 200. Functions of inputting and outputting various data and those of operating the various data by the CNN 200 may be performed by a communication part 110 and a processor 120 therein respectively. But, in FIG. 1, specific information on how the communication part 110 and the processor 120 are connected is omitted. In addition, the learning device may further include a memory 115 capable of storing computer readable instructions for performing following processes. As one example, the processor, the memory, a medium, etc. may be integrated with an integrated processor.

Figure 2:
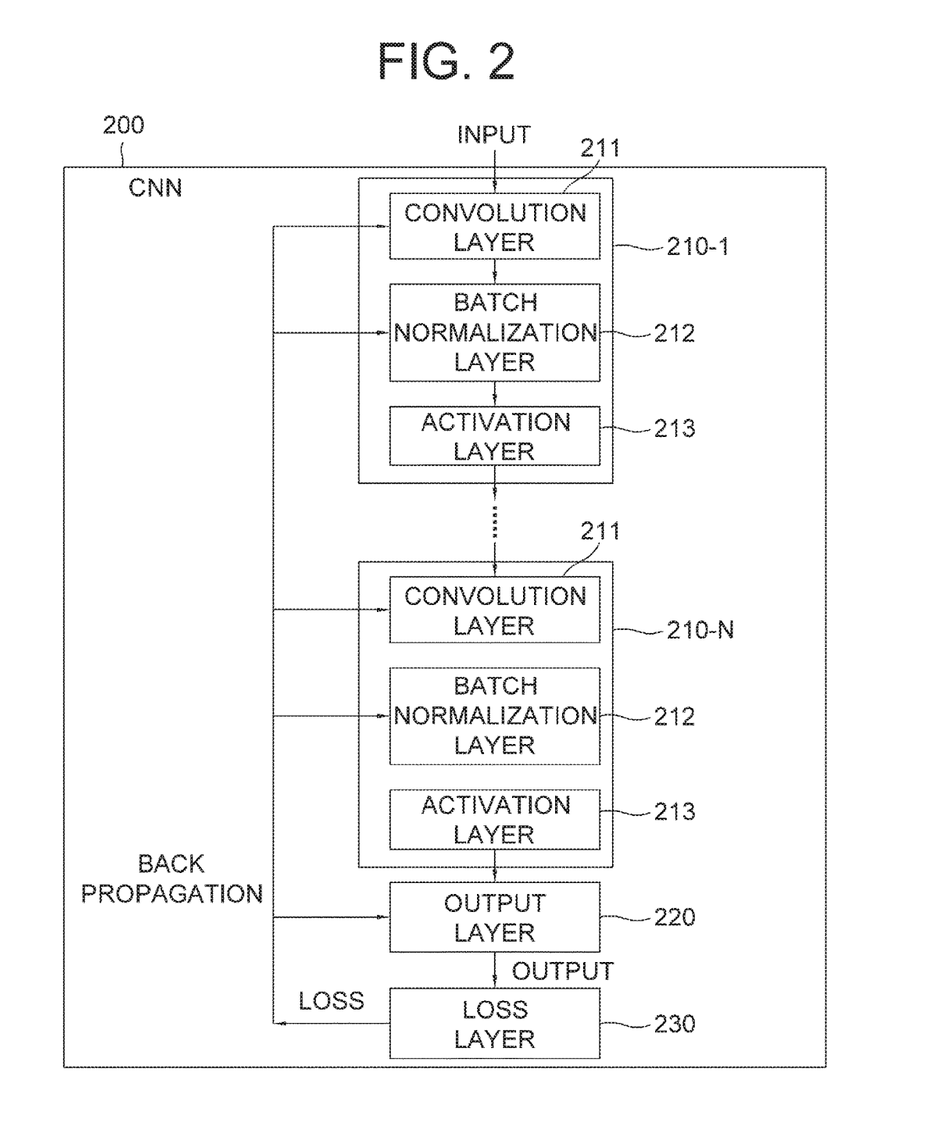
FIG. 2 shows a configuration of a CNN in accordance with the present disclosure.

FIG. 2 shows a configuration of the CNN 200 in accordance with the present disclosure.

By referring to FIG. 2, the CNN 200 may include (i) N convolutional blocks from 210-1 to 210-N each of which includes a convolutional layer 211, a batch normalization layer 212 and an activation layer 213, (ii) an output layer 220 and (iii) a loss layer 230.

Accordingly, if input images are acquired by a communication part 110, the input images may be operated through the first to the N-th convolutional blocks to generate re-adjusted feature maps, and the generated re-adjusted feature maps may be delivered to the output layer 220.

Specifically, explaining a first convolutional block 210-1 for example, the convolutional layer 211 included in the first convolutional block 210-1 may generate feature maps by applying convolution operations to the input images. And, the batch normalization layer 212 may generate adjusted feature maps by applying batch normalization operations to the feature maps outputted from the convolutional layer 211. After, the activation layer 213 may generate the re-adjusted feature maps by applying nonlinear operations to the adjusted feature maps. Specific information about the batch normalization operations will be explained by referring to FIG. 3 later. The nonlinear operation operated by the activation layer 213 may be a ReLU operation, but it may not be limited to this. Meanwhile, the activation layer 213 may not be essentially needed.

After the first re-adjusted feature maps are generated by the first convolutional block 210-1, the first re-adjusted feature maps may be delivered to a second convolutional block 210-2, and the convolution operations, the batch normalization operations and the nonlinear operations may be applied to the delivered first re-adjusted feature maps in the same way to the first convolutional block 210-1. By repeating these operations, n-th re-adjusted feature maps may be finally generated by the N-th convolutional block 210-N.

Hereafter, the output layer 220 may generate CNN output values by applying output operations to the n-th re-adjusted feature maps. The output operations may be operations for a segmentation, a clustering, or an object detection, but they may not be limited to these. After the CNN output values are generated by the output layer 220, the loss layer 230 may generate losses by referring to the CNN output values and their corresponding GTs. The losses may be used to learn parameters of at least part of the output layer 220, batch normalization layer 212, and convolutional layer 211 by backpropagating the losses.

As configurations of the CNN 200 have been explained above, how the batch normalization operations are performed will be explained hereafter.

Figure 3:
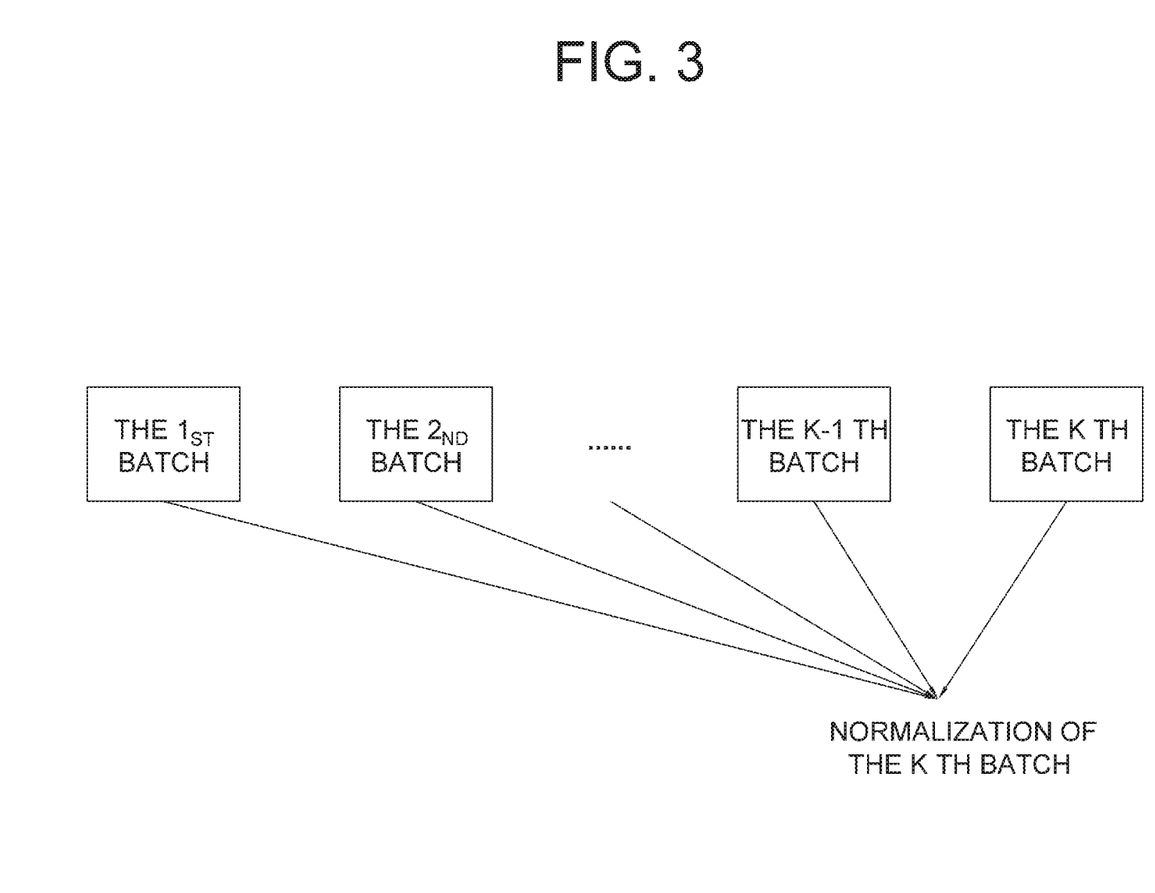
FIG. 3 shows an example process of the batch normalization in accordance with the present disclosure.

FIG. 3 shows an example process of the batch normalization operation in accordance with the present disclosure.

By referring to FIG. 3, the batch normalization operations in accordance with the present disclosure are operations for (i) generating feature maps for a k-th batch by applying the convolution operations to the input images included in the k-th batch in the convolutional layer 211 of each convolutional blocks, (ii) calculating one or more adjusted averages and one or more adjusted variations of the feature maps for the k-th batch by referring to (1) the feature maps for the k-th batch and additionally (2) previous feature maps for previous batches, which are a first to a (k−1)-th batches, and (iii) normalizing the feature maps for the k-th batch so that the adjusted averages and the adjusted variations become a first value and a second value respectively. Of course in case k is 1, only feature maps for the first batch may be used for normalizing the feature maps for the first batch. Meanwhile, an adjusted average and an adjusted variation may be generated per one channel included in the feature map, one by one.

Naturally, if a size of each batch is too small, it cannot be assumed that the values of the feature maps for each of the batches follow a normal distribution. But, in accordance with the present disclosure, as shown in FIG. 3, by additionally referring to the previous batches for the batch normalization operations, it can be assumed that feature maps follow a normal distribution or a distribution equivalent to the normal one owing to a bigger sample size. Then, optimized batch normalization results may be generated.

Characteristics of the present disclosure compared with the conventional batch normalization have been explained above, how the previous feature maps for the previous batches are referred to will be explained specifically.

Basically the adjusted averages and the adjusted variations may be generated by equally referring to the previous batches and the k-th batch. For example, in case the batch normalization operations are applied to feature maps for a 8-th batch by referring to all previous feature maps for a first to a 7-th batches and the feature maps for the 8-th batch and in case the feature values corresponding to each of specific pixels in the input images included in each of the first to the 8-th batch are {1, 4, 5, 6, 3, 5, 7, 8}(This example assumes one feature value per one batch for convenience, but there may be a plurality of feature values per one batch actually), the adjusted average may be 4.875, because all the previous batches and the present batch, i.e., the 8-th batch, are assigned with a same weight.

In other case, the adjusted averages and the adjusted variations may be generated by referring to the feature maps for the previous batches and the k-th batch with different weights assigned thereto respectively. Assume a case of referring to the previous feature maps for the first to the 7-th batches and the feature maps for the 8-th batch as the example above. In this case, if the feature maps for the 8-th batch are determined as the most important, the batch normalization layer 212 may assign 2 as a first weight to the feature maps for the 8-th batch, and if one of the old feature maps for the first batch is determined as not important, the batch normalization layer 212 may assign 0.5 as a second weight to the feature maps for the first batch. After assigning the weights, the batch normalization layer 212 sums the weighted feature values and divides the sum with 8.5 (considering weights, 6+0.5+2). In this case, the adjusted average is 5.47. It shows that the feature values corresponding to the 8-th batch are reflected highly and the feature values corresponding to the first batch are reflected less.

In the example above, only the example of the adjusted averages is shown, but it's self-evident that the adjusted variations can be generated with weights as the example above.

FIG. 3 is shown as if all the previous batches should be referred to, but it's not essential to refer to all the previous batches. Therefore, how to select the specific previous batches, to be used for generating the adjusted averages and the adjusted variations of the feature maps for the k-th batch, among the previous batches will be explained.

First, by referring to the variations of the feature maps for the k-th batch, the batch normalization layer 212 may determine the number of the batches, selected among the first to the (k−1)-th batches, to be used for generating the adjusted averages and the adjusted variations of the feature maps for the k-th batch. Accordingly, because the batch normalization is to prevent unbalanced distributions of the inputs for each layer, if the variations of the feature maps for the k-th batch are larger than a first specific threshold value, the batch normalization layer 212 may select a larger number of specific previous batches, to be used for generating the adjusted averages and the adjusted variations of the feature maps for the k-th batch, among the first to (k−1)-batches, to lessen unbalanceness of the k-th batch. On the contrary, if the variations are smaller than a first specific threshold value, the batch normalization layer 212 may select a smaller number of specific previous batches, because the unbalanceness of the k-th batch is small.

Furthermore, if a size of the k-th batch is larger than a second specific threshold value, it may be predicted that a good result will be generated without further referring to the previous batches. Accordingly, if there are enough input images, more than the second specific threshold value, in the k-th batch, it can be assumed that the feature maps for each of the batches follow a normal distribution owing to a large sample size. Therefore, it may be allowed for the batch normalization layer 212 to refer to a smaller number of the previous batches or refer to only the k-th batch. On the contrary, if there are few input images, less than the second specific threshold value, in the k-th batch, the sample size is so small that more batches would be necessary to make the feature maps for the k-th batch follow a normal distribution. Therefore, in this case, the batch normalization layer 212 may refer to more specific previous batches.

Also, the batch normalization layer 212 may select specific previous batches, to be used for generating the adjusted averages and the adjusted variations of the feature maps for the k-th batch, among the first to the (k−1)-th batches by referring to the number of times that each of the previous feature maps corresponding to each of the first to the (k−1)-th batches was used during the process of generating each of adjusted averages and adjusted variations for the second to the (k−1)-th batches. For example, the batch normalization layer 212 may not select frequently-used batches or select less-used batches. By this way, the selected batches to be used for the batch normalization operations may be diverse.

Otherwise, the batch normalization layer 212 may select the specific previous batches, to be used for generating the adjusted averages and the adjusted variations of the feature maps for the k-th batch, among the first to the (k−1)-th batches by referring to (i) information on whether each of averages of the previous feature maps corresponding to each of the first to the (k−1)-th batches is in a first specific range which is determined by referring to a first value, or (ii) information on whether each of variations of the previous feature maps corresponding to each of the first to (k−1)-th batches is in a second specific range determined by referring to a second value.

Accordingly, because the batch normalization is to make the feature maps corresponding to the input images less unbalanced, (i) specific previous feature maps for a specific previous batch whose averages are in the first specific range or (ii) the specific previous feature maps for the specific previous batch whose variations are in the second specific range are selected to generate the adjusted averages and the adjusted variations. By this way, the unbalanceness of the input images may be lessened.

Meanwhile, if the adjusted feature maps are generated by only applying the batch normalization operations explained above, the CNN output values outputted from the output layer may be limited due to linear characteristics of the adjusted feature maps fed into the output layer 220. Accordingly, the values of the adjusted feature maps are close to the first value so that the CNN output values may be converged to a specific range near the first range. Therefore, the CNN output values may be optimized owing to the adjusted feature maps, which were generated by further applying the linear operations.

The linear operation may follow a formula below, wherein $\gamma$ is a scaling parameter, $\beta$ is a bias parameter, and AF are feature maps for the k-th batch to which batch normalization operation is applied.

$$adjusted\_feature\_map = \gamma * AF + \beta$$

Now a configuration of the present disclosure functioning as a testing device will be explained.

Bringing in a testing device of batch normalization by using feature values of each batch including its corresponding test images, wherein the batches include a first to an m-th batches, the testing device includes components below.

For reference, in the description below, the phrase "for training" is added for terms related to the learning processes, and the phrase "for testing" is added for terms related to testing processes, to avoid possible confusion.

The testing device includes the communication part 110 and the processor 120. On condition that (1) the learning device has instructed the convolutional layer 211 of the CNN 200 (i) to acquire the k-th batch for training, wherein k is an integer from 1 to m, and (ii) to generate the feature maps for training for the k-th batch for training by applying the convolution operations to the training images included in the k-th batch for training respectively; and (2) the learning device has instructed the batch normalization layer 212 of the CNN 200 to (I) calculate the adjusted averages for training and the adjusted variations for training of the feature maps for training for the k-th batch for training by referring to (i) the feature maps for training for the k-th batch for training in case k is 1, and (ii) the feature maps for training for the k-th batch for training and the previous feature maps for training, included in at least part of previous batches for training selected among the first to the (k−1)-th batches for training, which were previously generated in case k is an integer from 2 to m, and to (II) generate the adjusted feature maps for training by applying the batch normalization operations to the feature maps for training for the k-th batch for training by referring to the adjusted averages for training and the adjusted variations for training; (3) the learning device has instructed the activation layer 213 of the CNN 200 to generate the re-adjusted feature maps for training by applying the nonlinear operations to the adjusted feature maps for training, wherein the CNN includes the first to the n-th convolutional blocks each of which includes the convolutional layer, the batch normalization layer and the activation layer, wherein, if the k-th batch for training is acquired, the re-adjusted feature maps for training are generated by applying operations through the first to the n-th convolutional blocks to the training images included in the k-th batch for training, wherein, if x is an integer from 2 to n, the x-th re-adjusted feature maps for training are generated by allowing the (x−1)-th re-adjusted feature maps for training outputted from the (x−1)-th convolutional block to be inputted to the x-th convolutional block, and has instructed the x-th convolutional block to generate the x-th re-adjusted feature maps for training; (4) the learning device has instructed the output layer 220 of the CNN 200 to generate the CNN output values for training by applying the output operations to the n-th re-adjusted feature maps for training outputted from the n-th convolutional block; and (5) the learning device has instructed the loss layer 230 of the CNN 200 to generate the losses by referring to the CNN output values for training and their corresponding GTs, and has learnt the parameters of the CNN by backpropagating the loss, the communication part 110 acquires the k-th batch for testing, wherein k is an integer from 1 to m.

And the processor 120 included in the testing device performs processes below.

First, the processor 120 instructs the convolutional layer 211 of the CNN 200 to generate feature maps for testing for the k-th batch for testing by applying the convolution operations to the test images included in the k-th batch for testing respectively.

Second, the processor 120 instructs the batch normalization layer 212 of the CNN 200 to (I) calculate one or more adjusted averages for testing and an adjusted variations for testing of the feature maps for testing for the k-th batch for testing by referring to (i) the feature maps for testing for the k-th batch for testing in case k is 1, and (ii) the feature maps for testing for the k-th batch for testing and previous feature maps for testing, included in at least part of previous batches for testing selected among the first to a (k−1)-th batches for testing, which were previously generated in case k is an integer from 2 to m, and to (II) generate adjusted feature maps for testing by applying the batch normalization operations to the feature maps for testing for the k-th batch for testing by referring to the adjusted averages for testing and the adjusted variations for testing.

Third, the processor 120 instructs the activation layer 213 of the CNN 200 to generate re-adjusted feature maps for testing by applying the nonlinear operations to the adjusted feature maps for testing, wherein the CNN includes the first to the n-th convolutional blocks each of which includes the convolutional layer, the batch normalization layer and the activation layer, wherein, if the k-th batch for testing is acquired, the re-adjusted feature maps for testing are generated by applying operations through the first to the n-th convolutional blocks to the input test images included in the k-th batch for testing, wherein, if x is an integer from 2 to n, the re-adjusted feature maps for testing are generated by allowing (x−1)-th re-adjusted feature maps for testing outputted from the (x−1)-th convolutional block to be inputted to the x-th convolutional block, and instructing the x-th convolutional block to generate x-th re-adjusted feature maps for testing.

Finally, the processor 120 instructs the output layer 220 of the CNN 200 to generate the CNN output values for testing by applying output operations to n-th re-adjusted feature maps for testing outputted from the n-th convolutional block.

The parts that the convolutional layer 211 applies the convolution operations to the input image, the batch normalization layer 212 applies the batch normalization operations to the feature maps, and the activation layer 213 applies the nonlinear operations to the feature maps in the testing process are similar to those of training steps, so detailed explanation is omitted.

As the configuration of the testing device is explained above, a relationship between the computing device and the testing device will be explained by referring to FIG. 2 again.

Because the training processes have been finished when the computing device functions as the testing device, the parts for generating losses and backpropagating the losses may be omitted. Thus, the configuration of the present disclosure functioning as the testing device is the same to the configuration as the computing device except the loss generating part, which is the loss layer 230, so that components from the N convolutional blocks to the output layer 220 may be the configuration of the testing device of the present disclosure.

Online batch normalization, on-device learning, or continual learning through the above stated method are applicable to mobile devices, IoT devices, and the like. Further, the method may be performed for military purpose, or other devices such as drones, robots.

The objects of the technical solution of the present disclosure or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present disclosure or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present disclosure and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variants equal or equivalent to the patent claims pertain to the category of the thought of the present disclosure.

What is claimed is:

1. A method of batch normalization by using feature values of each batch including its corresponding input images, wherein the batches include a first to an m-th batches, comprising steps of:
   (a) a computing device instructing a convolutional layer of a CNN (i) to acquire a k-th batch, wherein k is an integer from 1 to m, and (ii) to generate feature maps for the k-th batch by applying convolution operations to the input images included in the k-th batch respectively; and
   (b) the computing device instructing a batch normalization layer of the CNN to (I) calculate one or more adjusted averages and one or more adjusted variations of the feature maps for the k-th batch by referring to (i) the feature maps for the k-th batch in case k is 1, and (ii) the feature maps for the k-th batch and previous feature maps, included in at least part of previous batches selected among the first to a (k−1)-th batches, which were previously generated in case k is an integer from 2 to m, and to (II) generate adjusted feature maps by applying batch normalization operations to the feature maps for the k-th batch by referring to the adjusted averages and the adjusted variations.

2. The method of claim 1, further comprising a step of:
   (c) the computing device instructing an activation layer of the CNN to generate re-adjusted feature maps by applying nonlinear operations to the adjusted feature maps.

3. The method of claim 2, wherein the CNN includes a first to an n-th convolutional blocks each of which includes the convolutional layer, the batch normalization layer and the activation layer,
   wherein, if the k-th batch is acquired, the re-adjusted feature maps are generated by applying operations through the first to the n-th convolutional blocks to the input images included in the k-th batch,
   wherein, if x is an integer from 2 to n, the re-adjusted feature maps are generated by allowing (x−1)-th re-adjusted feature maps outputted from an (x−1)-th convolutional block to be inputted to an x-th convolutional block, and instructing an x-th convolutional block to generate x-th re-adjusted feature maps.

4. The method of claim 3, further comprising steps of:
   (d) the computing device instructing an output layer of the CNN to generate CNN output values by applying output operations to n-th re-adjusted feature maps outputted from the n-th convolutional block; and
   (e) the computing device instructing a loss layer to generate losses by referring to the CNN output values and their corresponding GTs, and learning parameters of the CNN by backpropagating the loss.

5. The method of claim 1, wherein the batch normalization operations are operations that normalize values included in the feature maps for the k-th batch such that the adjusted averages and the adjusted variations are adjusted to a first value and a second value respectively.

6. The method of claim 1, wherein, at the step of (b), by referring to variations of the feature maps for the k-th batch, the batch normalization layer determines the number of the batches, selected among the first to the (k−1)-th batches, to be used for generating the adjusted averages and the adjusted variations.

7. The method of claim 1, wherein, if variations of the feature maps for the k-th batch are smaller than a specific threshold value, the batch normalization layer calculates the adjusted averages and the adjusted variations by referring to (i) the feature maps for the k-th batch only or (ii) the feature maps for the k-th batch and specific previous feature maps for one or more specific previous batches, wherein the specific previous batches are selected among the first to the (k−1)-th batches such that a ratio of the number of the specific previous batches to (k−1) is less than a predefined number.

8. The method of claim 1, wherein, at the step of (b), by referring to the number of the input images included in the k-th batch, the batch normalization layer determines a ratio of the number of specific previous batches to (k−1), wherein the specific previous batches, to be used for calculating the adjusted averages and the adjusted variations, are selected among the first to the (k−1)-th batches.

9. The method of claim 1, wherein, at the step of (b), the batch normalization layer calculates the adjusted averages and the adjusted variations by referring to (i) the feature maps for the k-th batch with a first weight assigned thereto, and (ii) the previous feature maps for at least part of the first to the (k−1)-th previous batches with one or more second weights assigned thereto.

10. The method of claim 1, wherein, at the step of (b), the batch normalization layer selects specific previous batches, to be used for calculating the adjusted averages and the adjusted variations of the feature maps for the k-th batch, among the first to the (k−1)-th batches by referring to the number of times that each of the previous feature maps corresponding to each of the first to the (k−1)-th batches was used during the process of generating each of adjusted averages and each of adjusted variations for the second to the (k−1)-th batches.

11. The method of claim 1, wherein, at the step of (b), the batch normalization layer selects specific previous batches, to be used for calculating the adjusted averages and the adjusted variations of the feature maps for the k-th batch, among the first to the (k–1)-th batches by referring to (i) information on whether each of averages of the previous feature maps corresponding to each of the first to the (k–1)-th batches is in a first specific range which is determined by referring to a first value or not, or (ii) information on whether each of variations of the previous feature maps corresponding to each of the first to (k–1)-th batches is in a second specific range determined by referring to a second value or not.

12. The method of claim 1, wherein, at the step of (b), the batch normalization layer generates the adjusted feature maps for the k-th batch by applying linear operation to the feature maps for the k-th batch after the batch normalization operation is applied thereto, wherein the linear operation follows a formula below, $$adjusted\_feature\_map = \gamma * AF + \beta$$

$\gamma$ is a scaling parameter, $\beta$ is a bias parameter, and AF are feature maps for the k-th batch that batch normalization operation is applied thereto.

13. A testing method of batch normalization by using feature values of each batch including its corresponding test images, wherein the batches include a first to an m-th batches, comprising steps of:
(a) on condition that (1) a learning device has instructed a convolutional layer of a CNN (i) to acquire a k-th batch for training, wherein k is an integer from 1 to m, and (ii) to generate feature maps for training for the k-th batch for training by applying convolution operations to training images included in the k-th batch for training respectively; (2) the learning device has instructed a batch normalization layer of the CNN to (I) calculate one or more adjusted averages for training and one or more adjusted variations for training of the feature maps for training for the k-th batch for training by referring to (i) the feature maps for training for the k-th batch for training in case k is 1, and (ii) the feature maps for training for the k-th batch for training and previous feature maps for training, included in at least part of previous batches for training selected among the first to a (k–1)-th batches for training, which were previously generated in case k is an integer from 2 to m, and to (II) generate adjusted feature maps for training by applying batch normalization operations to the feature maps for training for the k-th batch for training by referring to the adjusted averages for training and the adjusted variations for training; (3) the learning device has instructed an activation layer of the CNN to generate re-adjusted feature maps for training by applying nonlinear operations to the adjusted feature maps for training, wherein the CNN includes a first to an n-th convolutional blocks each of which includes the convolutional layer, the batch normalization layer and the activation layer, wherein, if the k-th batch for training is acquired, the re-adjusted feature maps for training are generated by applying operations through the first to the n-th convolutional blocks to the training images included in the k-th batch for training, wherein, if x is an integer from 2 to n, x-th re-adjusted feature maps for training are generated by allowing (x–1)-th re-adjusted feature maps for training outputted from an (x–1)-th convolutional block to be inputted to an x-th convolutional block, and has instructed an x-th convolutional block to generate the x-th re-adjusted feature maps for training; (4) the learning device has instructed an output layer of the CNN to generate CNN output values for training by applying output operations to n-th re-adjusted feature maps for training outputted from the n-th convolutional block; and (5) the learning device has instructed a loss layer of the CNN to generate losses by referring to the CNN output values for training and their corresponding GTs, and has learnt parameters of the CNN by backpropagating the loss, a testing device instructing a convolutional layer of a CNN (i) to acquire a k-th batch for testing, wherein k is an integer from 1 to m, and (ii) to generate feature maps for testing for the k-th batch for testing by applying convolution operations to test images included in the k-th batch for testing respectively;

(b) the testing device instructing a batch normalization layer of the CNN to (I) calculate one or more adjusted averages for testing and one or more adjusted variations for testing of the feature maps for testing for the k-th batch for testing by referring to (i) the feature maps for testing for the k-th batch for testing in case k is 1, and (ii) the feature maps for testing for the k-th batch for testing and previous feature maps for testing, included in at least part of previous batches for testing selected among the first to a (k–1)-th batches for testing, which were previously generated in case k is an integer from 2 to m, and to (II) generate adjusted feature maps for testing by applying batch normalization operations to the feature maps for testing for the k-th batch for testing by referring to the adjusted averages for testing and the adjusted variations for testing;

(c) the testing device instructing an activation layer of the CNN to generate re-adjusted feature maps for testing by applying nonlinear operations to the adjusted feature maps for testing, wherein the CNN includes a first to an n-th convolutional blocks each of which includes the convolutional layer, the batch normalization layer and the activation layer, wherein, if the k-th batch for testing is acquired, the re-adjusted feature maps for testing are generated by applying operations through the first to the n-th convolutional blocks to the input test images included in the k-th batch for testing, wherein, if x is an integer from 2 to n, the re-adjusted feature maps for testing are generated by allowing (x–1)-th re-adjusted feature maps for testing outputted from an (x–1)-th convolutional block to be inputted to an x-th convolutional block, and instructing an x-th convolutional block to generate x-th re-adjusted feature maps for testing; and (d) the testing device instructing an output layer of the CNN to generate CNN output values for testing by applying output operations to n-th re-adjusted feature maps for testing outputted from the n-th convolutional block.

14. A computing device of batch normalization by using feature values of each batch including its corresponding input images, wherein the batches include a first to an m-th batches, comprising:
at least one memory that stores instructions; and
at least one processor configured to execute the instructions to: perform processes of (1) instructing a convolutional layer of a CNN to generate feature maps for a k-th batch by applying convolution operations to the input images included in the k-th batch respectively, wherein k is an integer from 1 to m, and (2) instructing a batch normalization layer of the CNN to (I) calculate one or more adjusted averages and one or more adjusted variations of the feature maps for the k-th batch by referring to (i) the feature maps for the k-th batch in case k is 1, and (ii) the feature maps for the k-th batch and previous feature maps, included in at least part of previous batches selected among the first to a (k−1)-th batches, which were previously generated in case k is an integer from 2 to m, and to (II) generate adjusted feature maps by applying batch normalization operations to the feature maps for the k-th batch by referring to the adjusted averages and the adjusted variations.

15. The computing device of claim 14, wherein the processor further performs a process of:
   (3) instructing an activation layer of the CNN to generate re-adjusted feature maps by applying nonlinear operations to the adjusted feature maps.

16. The computing device of claim 15, wherein the CNN includes a first to an n-th convolutional blocks each of which includes the convolutional layer, the batch normalization layer and the activation layer,
   wherein, if the k-th batch is acquired, the re-adjusted feature maps are generated by applying operations through the first to the n-th convolutional blocks to the input images included in the k-th batch,
   wherein, if x is an integer from 2 to n, the re-adjusted feature maps are generated by allowing (x−1)-th re-adjusted feature maps outputted from an (x−1)-th convolutional block to be inputted to an x-th convolutional block, and instructing an x-th convolutional block to generate x-th re-adjusted feature maps.

17. The computing device of claim 16, wherein the processor further performs processes of:
   (4) instructing an output layer of the CNN to generate CNN output values by applying output operations to n-th re-adjusted feature maps outputted from the n-th convolutional block; and
   (5) instructing a loss layer to generate losses by referring to the CNN output values and their corresponding GTs, and learning parameters of the CNN by backpropagating the loss.

18. The computing device of claim 14, wherein the batch normalization operations are operations that normalize values included in the feature maps for the k-th batch such that the adjusted averages and the adjusted variations are adjusted to a first value and a second value respectively.

19. The computing device of claim 14, wherein, at the process of (2), by referring to variations of the feature maps for the k-th batch, the batch normalization layer determines the number of the batches, selected among the first to the (k−1)-th batches, to be used for calculating the adjusted averages and the adjusted variations.

20. The computing device of claim 14, wherein, if variations of the feature maps for the k-th batch are smaller than a specific threshold value, the batch normalization layer calculates the adjusted averages and the adjusted variations by referring to (i) the feature maps for the k-th batch only or (ii) the feature maps for the k-th batch and specific previous feature maps for one or more specific previous batches, wherein the specific previous batches are selected among the first to the (k−1)-th batches such that a ratio of the number of the specific previous batches to (k−1) is less than a predefined number.

21. The computing device of claim 14, wherein, at the process of (2), by referring to the number of the input images included in the k-th batch, the batch normalization layer determines a ratio of the number of specific previous batches to (k−1), wherein the specific previous batches, to be used for calculating the adjusted averages and the adjusted variations, are selected among the first to the (k−1)-th batches.

22. The computing device of claim 14, wherein, at the process of (2), the batch normalization layer calculates the adjusted averages and the adjusted variations by referring to (i) the feature maps for the k-th batch with a first weight assigned thereto, and (ii) the previous feature maps for at least part of the first to the (k−1)-th previous batches with one or more second weights assigned thereto.

23. The computing device of claim 14, wherein, at the process of (2), the batch normalization layer selects specific previous batches, to be used for calculating the adjusted averages and the adjusted variations of the feature maps for the k-th batch, among the first to the (k−1)-th batches by referring to the number of times that each of the previous feature maps corresponding to each of the first to the (k−1)-th batches was used during the process of calculating each of adjusted averages and each of adjusted variations for the second to the (k−1)-th batches.

24. The computing device of claim 14, wherein, at the process of (2), the batch normalization layer selects specific previous batches, to be used for calculating the adjusted averages and the adjusted variations of the feature maps for the k-th batch, among the first to the (k−1)-th batches by referring to (i) information on whether each of averages of the previous feature maps corresponding to each of the first to the (k−1)-th batches is in a first specific range which is determined by referring to a first value or not, or (ii) information on whether each of variations of the previous feature maps corresponding to each of the first to (k−1)-th batches is in a second specific range determined by referring to a second value or not.

25. The computing device of claim 14, wherein, at the process of (2), the batch normalization layer generates the adjusted feature maps for the k-th batch by applying linear operation to the feature maps for the k-th batch after the batch normalization operation is applied thereto, wherein the linear operation follows a formula below, $$\text{adjusted\_feature\_map} = \gamma * AF + \beta$$

γ is a scaling parameter, γ is a bias parameter, and AF are feature maps for the k-th batch that batch normalization operation is applied thereto.

26. A testing device of batch normalization by using feature values of each batch including its corresponding test images, wherein the batches include a first to an m-th batches, comprising:
   at least one memory that stores instructions; and
   at least one processor, on condition that (1) a learning device has instructed a convolutional layer of a CNN (i) to acquire a k-th batch for training, wherein k is an integer from 1 to m, and (ii) to acquire feature maps for training for the k-th batch for training by applying convolution operations to training images included in the k-th batch for training respectively; and (2) the learning device has instructed a batch normalization layer of the CNN to (I) calculate adjusted averages for training and adjusted variations for training of the feature maps for training for the k-th batch for training by referring to (i) the feature maps for training for the k-th batch for training in case k is 1, and (ii) the feature maps for training for the k-th batch for training and previous feature maps for training, included in at least part of previous batches for training selected among the first to a (k−1)-th batches for training, which were previously generated in case k is an integer from 2 to m, and to (II) generate adjusted feature maps for training by applying batch normalization operations to the feature maps for training for the k-th batch for training by referring to the adjusted averages for training and the adjusted variations for training; (3) the learning device has instructed an activation layer of the CNN to generate re-adjusted feature maps for training by applying nonlinear operations to the adjusted feature maps for training, wherein the CNN includes a first to an n-th convolutional blocks each of which includes the convolutional layer, the batch normalization layer and the activation layer, wherein, if the k-th batch for training is acquired, the re-adjusted feature maps for training are generated by applying convolution operations through the first to the n-th convolutional blocks to the training images included in the k-th batch for training, wherein, if x is an integer from 2 to n, x-th re-adjusted feature maps for training are generated by allowing (x−1)-th re-adjusted feature maps for training outputted from an (x−1)-th convolutional block to be inputted to an x-th convolutional block, and has instructed an x-th convolutional block to generate the x-th re-adjusted feature maps for training; (4) the learning device has instructed an output layer of the CNN to generate CNN output values for training by applying output operations to n-th re-adjusted feature maps for training outputted from the n-th convolutional block; and (5) the learning device has instructed a loss layer of the CNN to generate losses by referring to the CNN output values for training and their corresponding GTs, and has learnt parameters of the CNN by back-propagating the loss, a communication part for acquiring a k-th batch for testing, wherein k is an integer from 1 to m; configured to execute the instructions to: perform processes of (1) instructing a convolutional layer of a CNN to acquire feature maps for testing for the k-th batch for testing by applying convolution operations to test images included in the k-th batch for testing respectively; (2) instructing a batch normalization layer of the CNN to (I) calculate adjusted averages for testing and adjusted variations for testing of the feature maps for testing for the k-th batch for testing by referring to (i) the feature maps for testing for the k-th batch for testing in case k is 1, and (ii) the feature maps for testing for the k-th batch for testing and previous feature maps for testing, included in at least part of previous batches for testing selected among the first to a (k−1)-th batches for testing, which were previously generated in case k is an integer from 2 to m, and to (II) generate adjusted feature maps for testing by applying batch normalization operations to the feature maps for testing for the k-th batch for testing by referring to the adjusted averages for testing and the adjusted variations for testing; (3) instructing an activation layer of the CNN to generate re-adjusted feature maps for testing by applying nonlinear operations to the adjusted feature maps for testing, wherein the CNN includes a first to an n-th convolutional blocks each of which includes the convolutional layer, the batch normalization layer and the activation layer, wherein, if the k-th batch for testing is acquired, the re-adjusted feature maps for testing are generated by applying convolution operations through the first to the n-th convolutional blocks to the input test images included in the k-th batch for testing, wherein, if x is an integer from 2 to n, the re-adjusted feature maps for testing are generated by allowing (x−1)-th re-adjusted feature maps for testing outputted from an (x−1)-th convolutional block to be inputted to an x-th convolutional block, and instructing an x-th convolutional block to generate x-th re-adjusted feature maps for testing; and (4) instructing an output layer of the CNN to generate CNN output values for testing by applying output operations to n-th re-adjusted feature maps for testing outputted from the n-th convolutional block.

\* \* \* \* \*